United States Patent [19]
Berman

[11] 3,818,292
[45] June 18, 1974

[54] ELECTRONIC ACCELERATOR CONTROL FOR ELECTRIC VEHICLE

[75] Inventor: Alby M. Berman, Oak Park, Mich.

[73] Assignee: Energy Development Association, Madison Heights, Mich.

[22] Filed: Nov. 17, 1972

[21] Appl. No.: 307,686

[52] U.S. Cl................................. 318/139, 318/341
[51] Int. Cl. ............................................ H02p 5/16
[58] Field of Search......... 318/129, 341; 324/34 PS, 324/34 D, 45; 307/309

[56] References Cited
UNITED STATES PATENTS

| 2,828,396 | 3/1958 | Forman | 307/309 |
| 3,286,161 | 11/1966 | Jones | 324/45 |
| 3,395,333 | 7/1968 | Aiken | 307/309 |
| 3,686,549 | 8/1972 | Windebrener | 318/341 |

Primary Examiner—Bernard A. Gilheany
Assistant Examiner—Thomas Langer
Attorney, Agent, or Firm—Fisher, Krass, Young & Gerhardt

[57] ABSTRACT

A vehicle powered by a storage battery employs a foot pedal which adjusts the position of a permanent magnet relative to a Hall effect device. The voltage output from the Hall effect device, a non-linear function of the magnet position, is used to control the frequency of a fixed pulse width chopper which applies a battery current to the drive motor.

12 Claims, 3 Drawing Figures

PATENTED JUN 18 1974         3,818,292

ELECTRONIC ACCELERATOR CONTROL FOR ELECTRIC VEHICLE

BACKGROUND OF THE INVENTION

1. Field of the Invention

This invention relates to an accelerator control for an electric vehicle which varies the distance between a magnet and a Hall effect device to control the power applied to the drive motor from the vehicle battery.

2. Background of the Invention

The proportional control of the application of electric power from a source to a load is usually accomplished through a variable resistance device such as a rheostat or potentiometer. In very low power applications the variable resistance may be connected to the load so as to effectively share the power with the load, with that portion of the power which is not applied to the load being dissipated in the resistance in the form of heat. In higher power applications the variable resistance may act as a control element to regulate the period of conduction of a switching device, or chopper, disposed between the electrical power source and the load.

Variable resistance devices generally employ a mechanical contact which slides over the surface of a resistance element. The frictional contact between these two surfaces inevitably results in wear limiting the life of the variable resistance unit and decreasing its reliability. Another problem associated with variable resistance devices is the build-up of non-conductive matter on the resistance or the contact element. This results in a power loss across the point of contact which in turn tends to heat and degrade the contacting surfaces.

The limited life and reliability of the sliding contact variable resistance units makes them generally unsatisfactory for use in accelerometers which control the application of power from a battery or generator to the electric drive motor for a vehicle. The accelerometer is normally actuated by a foot pedal and during use there is a continuous shifting of the control setting which would produce rapid wear on the resistance element. The relatively uncontrolled physical environment in the vehicle, which may be quite dirty or wet, also tends to shorten the life and reliability of sliding resistance units.

SUMMARY OF THE PRESENT INVENTION

The present invention is directed to an accelerator control for use in an electric vehicle which eliminates the need for a variable resistance as a position transducer. The invention broadly utilizes the motion of an accelerometer pedal to control the position of a magnet relative to a semi-conductor device of the type having an output dependent upon its ambient magnetic field. In a preferred embodiment of the invention, which will subsequently be disclosed in detail, the semi-conductor element is a Hall effect device which provides an output voltage as a function of the magnetic field imposed on the device. This output is amplified and provided a voltage controlled oscillator. The oscillator output is used to trigger a fixed pulse width chopper connected between the vehicle battery and the drive motor. The "on time" of the chopper is proportional to the frequency of its input which is in turn proportional to the position of the magnet relative to the Hall effect device.

This accelerator arrangement provides a number of advantages in addition to its extended life and reliability relative to a variable resistance.

Since the field imposed by the magnet on the semi-conductor is inversely proportional to the square of the distance between the semi-conductor and the magnet, the unit has a nonlinear output with respect to accelerator pedal position which duplicates the "feel" of the accelerator employed with internal combustion engine powered vehicles. When the accelerator is only slightly depressed, as in the low speed range of the vehicle, a given movement of the accelerator pedal produces a lesser change in speed than it does when the pedal is more fully depressed. This provides the relatively fine control over low speeds which drivers are accustomed to experiencing.

As no direct mechanical connection between the magnet and the transducer is required the installation of a transducer for the system of the present invention is very simple and may take a wide variety of forms. The units may be directly supported on the accelerator pedal and the vehicle body adjacent the pedal or they may be disposed in a more remote, shielded location and connected to the accelerator pedal through a conventional motion transfer mechanism such as a flexible cable.

An accelerator control formed in accordance with the present invention may be used with any vehicle drive system wherein the electric power to be applied to a drive motor must be controlled. Such vehicles include hybrid systems wherein a combustion engine drives an alternator or generator and that power is applied to the drive motor as well as to battery powered systems.

Other objectives and advantages of the present invention will be made apparent by the following detailed description of two preferred embodiments of the invention. The description makes reference to the accompanying drawings in which.

Figure 1:
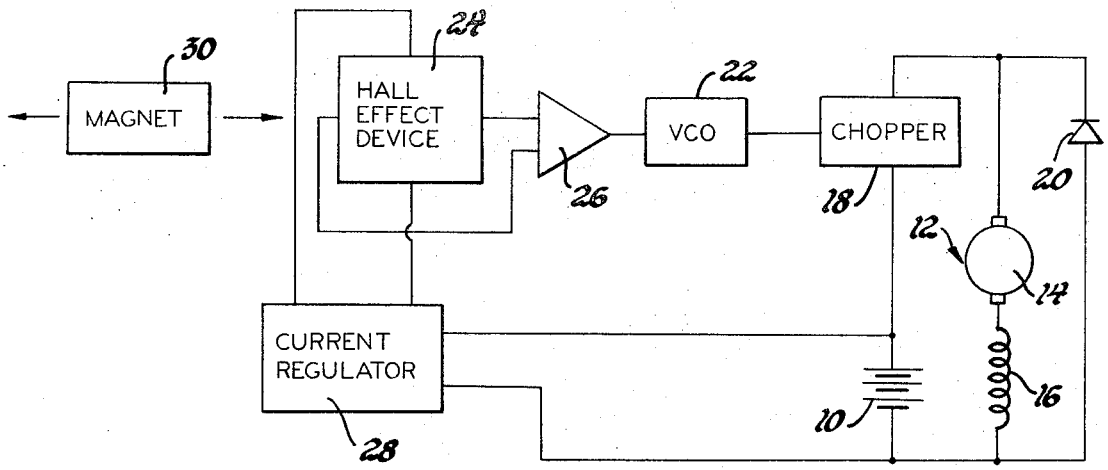
FIG. 1 is a schematic drawing of an electric vehicle drive system employing the present invention for speed control.

Referring to FIG. 1, the system of the present invention acts to control the application of power from a vehicle battery 10 to one or more drive motors, generally indicated at 12. The drive motor is illustrated as a series motor having an armature 14 connected to field winding 16. Power is applied from the battery 10 to the motor 12 through a solid state electronic chopper 18. A diode 20 shunts the motor in the reverse direction to provide a current path when the battery is not connected to the motor.

The chopper 18 is preferably of a fixed pulse width variable frequency type that is well-known in the art. The chopper closure is triggered by signals from a voltage controlled oscillator 22 which receives the voltage output of a Hall effect semi-conductor 24 through a high gain DC linear amplifier 26.

Hall effect devices are commercially available and the one employed in the preferred embodiment of the invention is Model BH-700 produced by F. W. Bell Incorporated of Columbus, Ohio. The Hall effect device receives 200 milliamps from a current regulator 28 connected to the battery 10. It provides a voltage output of 50 millivolts per kilogauss of magnetic field imposed across it. The magnetic field is imposed by a permanent magnet 30 supported for motion toward and away from the Hall effect device 24 by a suitable mechanism which will be subsequently described.

The arrangement is such that the average period of conduction of the chopper 18 and thus the power applied to the motor 12 is a function of the distance between the magnet 30 and the Hall effect device 24 since the chopper 18 is controlled by the oscillator 22 at a rate which is a function of the voltage output of the Hall effect device.

Figure 2:
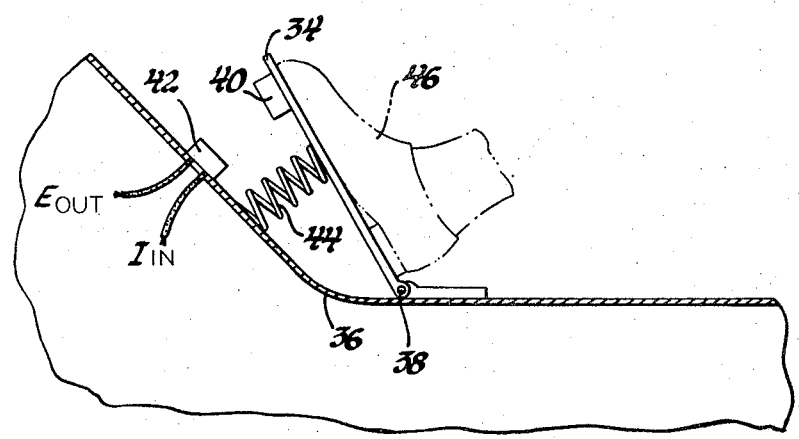
FIG. 2 is a schematic diagram of a first physical arrangement for the transducer element employed in connection with the present invention.

FIG. 2 illustrates the inherent simplicity of the accelerator arrangement in the present speed control system. An accelerator pedal 34 is supported above a floorboard 36 for pivoting motion about a hinge 38. A magnet 40 is affixed to the underside of the pedal 34 adjacent its free outer end and a Hall effect device 42 is affixed to the floorboard of a vehicle beneath the pedal. A spring 44 biases the pedal 34 away from the floorboard. Pressure exerted on the pedal 34 by the foot 46 of the operator overcomes the bias of the spring 44 and presses the pedal downwardly to bring the magnet 40 closer to the device 42. The magnetic field imposed on the Hall device is inversely proportional to the square of the distance between the magnet and the device. Accordingly, as the pedal 34 is urged closer to the floor an exponentially increasing voltage output is provided from the device 42.

Figure 3:
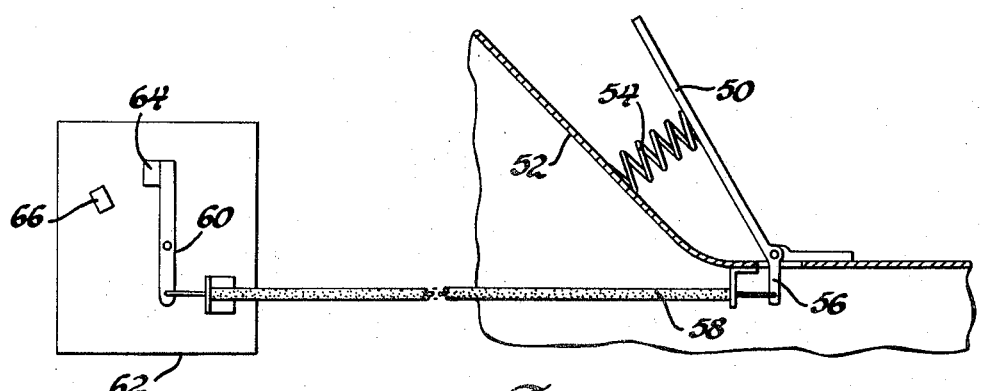
FIG. 3 is a schematic diagram of a second form of mechanical arrangement for the transducer of the present invention.

FIG. 3 illustrates an alternative arrangement for housing the accelerator control element. A pedal 50 is pivotally supported with respect to a floorboard 52 and is biased outwardly by a spring 54. A bell crank 56 is attached to the bottom of the pedal so as to pivot with the pedal. A flexible cable 58 connects the bell crank 56 with a second bell crank 60 pivotably supported within a magnetically shielding housing 62. A magnet 64 is attached to the opposite end of the bell crank from the flexible cable so as to move toward and away from a Hall effect device 66 supported within the housing.

This arrangement has the advantage of shielding the Hall effect device from stray magnetic fields which might otherwise be imposed on it. The housing 62 may be formed of any magnetic material.

The embodiments of the invention in which an exclusive property or privilege is claimed are defined as follows:

1. A speed control for a vehicle having an electric power source and an electric drive motor including means for generating a magnetic field; a semi-conductor means having an electrical output which is a nonlinear function of its distance from said field generating means; field; means for supporting the semi-conductor device and the magnetic field generating means for relative motion toward and away from one another; and means for controlling power flow from the power source to the drive motor as a function of the output of the semi-conductor device whereby the power flow is a non-linear function of the relative position between the semi-conductor device and the magnetic field generating means.

2. The speed control of claim 1 wherein the semi-conductor means comprises a Hall effect device having a voltage output which is a function of the magnetic field applied to the device.

3. The speed control device of claim 1 including a foot pedal supported for motion relative to the vehicle frame and connected to either the semi-conductor means or the means for generating magnetic fields so that the relative positions of the semi-conductor means and the means for generating magnetic fields may be varied by pressing the pedal.

4. The speed control device of claim 1 wherein said means for controlling power flow from the power source to the drive motor as a function of the output of the semi-conductor means includes a chopper circuit connected to the semi-conductor means so as to have a period of conduction which is a function of the output of the semi-conductor means.

5. The speed control device of claim 1 wherein the semi-conductor means comprises a Hall effect device having a current passed through it from said electric power source.

6. The speed control device of claim 5 wherein the electrical output of the Hall effect device is applied to a voltage controlled oscillator to generate a signal having a variable frequency proportional to such electrical output, the means for controlling the power flow from the power source to the drive motor as a function of the output of the semi-conductor means constitutes a chopper, and the chopper conduction period is controlled by said variable frequency signal.

7. An accelerator control for a vehicle having an electric power source and an electric drive motor, comprising: a pedal supported on said vehicle for motion toward and away from a surface of said vehicle; means for biasing said pedal away from said surface; means for generating a magnetic field; a semi-conductor means having an electric output which is a nonlinear function of its distance from said field generating means; means for supporting one of said semi-conductor devices and said means for generating a magnetic field on the pedal and for supporting the other on the vehicle so that motion of the pedal relative to the vehicle varies the distance between said semi-conductor device and said means for generating a magnetic field; and means for controlling power flow from the power source to the drive motor as a function of the output of the semi-conductor device.

8. The accelerator device of claim 7 wherein said means for controlling power flow from the power source to the drive motor constitutes a chopper connected between said electrical power source and said electric drive motor.

9. The accelerator control of claim 8 wherein the chopper is a fixed pulse width variable frequency type and its frequency of operation is controlled as a function of the output of the semi-conductor means.

10. The accelerator control of claim 7 wherein the semi-conductor means comprises a Hall effect device.

11. The accelerator control of claim 7 wherein said means for generating a magnetic field constitutes a permanent magnet.

12. A speed control for a vehicle having an electric power source and an electric drive motor comprising a foot pedal pivotally supported with respect to the vehicle; spring means for biasing one end of said foot pedal away from said vehicle; a Hall effect semi-conductor device and a permanent magnet, one being affixed to the foot pedal and the other affixed to the vehicle so that motion of the foot pedal toward and away from the vehicle varies the position of the magnet relative to the position of the semi-conductor device; and a power source operative to pass current through said Hall effect device; a variable frequency oscillator connected to the voltage output of said Hall effect device so as to provide an output signal having a frequency which is a function of the voltage output of the Hall effect device; a chopper connected between said power source and said electric drive motor; and means for controlling the period of conduction of said chopper as a function of the frequency of said voltage controlled oscillator, whereby the power applied from said power source to said drive motor is a non-linear function of the position of the foot pedal relative to the vehicle.

* * * * *

UNITED STATES PATENT OFFICE
CERTIFICATE OF CORRECTION

Patent No. 3,818,292          Dated   June 18, 1974

Inventor(s)   Alby M. Berman

It is certified that error appears in the above-identified patent and that said Letters Patent are hereby corrected as shown below:

Change the name of the Assignee to read --Energy Development Associates--.

Column 3, line 57 delete "field;".

Signed and sealed this 1st day of October 1974.

(SEAL)
Attest:

McCOY M. GIBSON JR.
Attesting Officer

C. MARSHALL DANN
Commissioner of Patents